United States Patent
Young et al.

(10) Patent No.: US 12,278,353 B2
(45) Date of Patent: Apr. 15, 2025

(54) SYSTEMS AND METHODS FOR REMOVAL AND RECYCLING OF ALUMINUM IMPURITIES FROM BATTERY WASTE

(71) Applicant: Li Industries, Inc., Pineville, NC (US)

(72) Inventors: David Young, Sudbury, MA (US); Tairan Yang, Blacksburg, VA (US); Panni Zheng, Blacksburg, VA (US); Zheng Li, Blacksburg, VA (US)

(73) Assignee: Li Industries, Inc., Pineville, NC (US)

( * ) Notice: Subject to any disclaimer, the term of this patent is extended or adjusted under 35 U.S.C. 154(b) by 0 days.

(21) Appl. No.: 18/745,378

(22) Filed: Jun. 17, 2024

(65) Prior Publication Data
US 2024/0429479 A1 Dec. 26, 2024

Related U.S. Application Data

(60) Provisional application No. 63/509,661, filed on Jun. 22, 2023.

(51) Int. Cl.
*H01M 10/54* (2006.01)
*C22B 7/00* (2006.01)
(Continued)

(52) U.S. Cl.
CPC ............ *H01M 10/54* (2013.01); *C22B 7/005* (2013.01); *C22B 7/008* (2013.01);
(Continued)

(58) Field of Classification Search
None
See application file for complete search history.

(56) References Cited

U.S. PATENT DOCUMENTS

| | | | |
|---|---|---|---|
| 5,429,889 A | 7/1995 | Tu Xuan et al. | |
| 7,902,299 B2 | 3/2011 | Kerr et al. | |

(Continued)

FOREIGN PATENT DOCUMENTS

| | | | |
|---|---|---|---|
| CN | 101192693 A | 6/2008 | |
| CN | 102703706 A | 10/2012 | |

(Continued)

OTHER PUBLICATIONS

English translation of CN-108996484-A Description (Year: 2018).*
(Continued)

*Primary Examiner* — Daniel Berns
*Assistant Examiner* — Zachary John Baum
(74) *Attorney, Agent, or Firm* — COOLEY LLP

(57) ABSTRACT

Embodiments described herein relate to removal of aluminum impurities from battery waste. In some aspects, a method for removing aluminum impurities includes preprocessing a quantity of battery waste to improve removal of aluminum impurities from the quantity of battery waste. The method further includes removing at least a portion of the aluminum impurities from the quantity of battery waste, modifying the removed aluminum impurities to form a coating precursor and/or a doping precursor, and applying the coating precursor and/or the doping precursor to an electrode material. In some embodiments, the method further includes characterizing the aluminum impurities in the quantity of battery waste and regenerating the electrode material. In some embodiments, the removing can be via sieving, cyclone separation, air separation, elutriation, and/or dissolution. In some embodiments, the doping precursor can include aluminum hydroxide ($Al(OH)_3$). In some embodiments, the regenerating includes applying a heat treatment to the electrode material.

28 Claims, 4 Drawing Sheets

(51) Int. Cl.
  *C22B 21/00* (2006.01)
  *H01M 4/02* (2006.01)
  *H01M 4/58* (2010.01)

(52) U.S. Cl.
  CPC ....... *C22B 21/0023* (2013.01); *H01M 4/5825* (2013.01); *H01M 2004/028* (2013.01)

(56) References Cited

U.S. PATENT DOCUMENTS

| | | | |
|---|---|---|---|
| 8,067,107 | B2 | 11/2011 | Sloop et al. |
| 8,497,030 | B2 | 7/2013 | Sloop |
| 8,823,329 | B2 | 9/2014 | Sloop et al. |
| 8,846,225 | B2 | 9/2014 | Sloop |
| 9,287,552 | B2 | 3/2016 | Sloop |
| 9,484,606 | B1 | 11/2016 | Sloop et al. |
| 9,825,341 | B2 | 11/2017 | Sloop |
| 10,014,562 | B2 | 7/2018 | Sloop |
| 10,333,183 | B2 | 6/2019 | Sloop |
| 11,394,062 | B2 | 7/2022 | Sloop |
| 11,631,909 | B2 | 4/2023 | Young et al. |
| 11,894,530 | B2 | 2/2024 | Young et al. |
| 2003/0082453 | A1 | 5/2003 | Numata et al. |
| 2007/0134546 | A1 | 6/2007 | Hashimoto |
| 2010/0146761 | A1 | 6/2010 | Sloop |
| 2010/0203366 | A1 | 8/2010 | Sloop |
| 2013/0206607 | A1 | 8/2013 | Kojima et al. |
| 2013/0256198 | A1 | 10/2013 | Ellis et al. |
| 2013/0266855 | A1 | 10/2013 | Kim et al. |
| 2013/0302226 | A1 | 11/2013 | Wang et al. |
| 2016/0072162 | A1 | 3/2016 | Kepler et al. |
| 2016/0372802 | A1 | 12/2016 | Chiang et al. |
| 2018/0034050 | A1 | 2/2018 | Son et al. |
| 2018/0261894 | A1 | 9/2018 | Wang et al. |
| 2019/0260100 | A1 | 8/2019 | Sloop |
| 2020/0136170 | A1* | 4/2020 | Shin ...................... H01M 4/505 |
| 2021/0143489 | A1 | 5/2021 | Sloop et al. |
| 2022/0029217 | A1 | 1/2022 | Young et al. |
| 2022/0271356 | A1 | 8/2022 | Sloop et al. |
| 2022/0352572 | A1 | 11/2022 | Sloop |
| 2023/0045467 | A1 | 2/2023 | Park et al. |
| 2023/0070883 | A1 | 3/2023 | Sloop et al. |
| 2023/0198041 | A1 | 6/2023 | Sloop et al. |
| 2023/0246260 | A1 | 8/2023 | Young et al. |
| 2023/0369671 | A1 | 11/2023 | Zheng et al. |
| 2023/0395889 | A1 | 12/2023 | Yang et al. |
| 2023/0411725 | A1 | 12/2023 | Yang et al. |
| 2024/0186604 | A1 | 6/2024 | Miyanaga et al. |
| 2024/0186607 | A1 | 6/2024 | Young et al. |

FOREIGN PATENT DOCUMENTS

| | | | |
|---|---|---|---|
| CN | 103915661 | A | 7/2014 |
| CN | 105375077 | A | 3/2016 |
| CN | 106654434 | A | 5/2017 |
| CN | 108735998 | A | 11/2018 |
| CN | 108996484 | A * | 12/2018 |
| CN | 109193063 | A | 1/2019 |
| CN | 110828887 | A * | 2/2020 |
| CN | 113571699 | A | 10/2021 |
| EP | 1041659 | A1 | 10/2000 |
| EP | 4095982 | A1 | 11/2022 |
| JP | 2009032678 | A * | 2/2009 |
| JP | 2013001950 | A | 1/2013 |
| JP | 2013111543 | A | 6/2013 |
| JP | 2014203567 | A | 10/2014 |
| KR | 20000029651 | A | 5/2000 |
| KR | 20210145456 | A | 12/2021 |
| WO | WO-0019557 | A1 | 4/2000 |
| WO | WO-2007088617 | A1 | 8/2007 |
| WO | WO-2009105713 | A1 | 8/2009 |
| WO | WO-2010014637 | A1 | 2/2010 |
| WO | WO-2010077982 | A2 | 7/2010 |
| WO | WO-2011109831 | A2 | 9/2011 |
| WO | WO-2012042714 | A1 | 4/2012 |
| WO | WO-2014017086 | A1 | 1/2014 |
| WO | WO-2016022858 | A1 | 2/2016 |
| WO | WO-2017142644 | A2 | 8/2017 |
| WO | WO-2018014136 | A1 | 1/2018 |
| WO | WO-2020112813 | A1 | 6/2020 |
| WO | WO-2020236513 | A1 | 11/2020 |
| WO | WO-2021096990 | A1 | 5/2021 |
| WO | WO-2021241819 | A1 | 12/2021 |
| WO | WO-2022209421 | A1 | 10/2022 |
| WO | WO-2023019224 | A1 | 2/2023 |
| WO | WO-2023060992 | A1 * | 4/2023 ............ H01M 10/54 |
| WO | WO-2023220102 | A1 | 11/2023 |
| WO | WO-2024124031 | A2 | 6/2024 |
| WO | WO-2024263518 | | 12/2024 |

OTHER PUBLICATIONS

English translation of CN-110828887-A Description (Year: 2020).*
English translation of WO-2023060992-A1 Description (Year: 2023).*
English translation of JP-2009032678-A Description (Year: 2009).*
Khosravi, M., et al. Generalized preparation method and characterization of aluminum isopropoxide, aluminum phenoxide, and aluminum n-hexyloxide. Polyhedron 62 (2013) 18-25 (Year: 2013).*
Kulka, A., et al. Possibility of modification of phosphoolivine by substitution in Li sublattice. Solid State Ionics 225 (2012) 575-579. (Year: 2012).*
International Search Report and Written Opinion for International Application No. PCT/US2024/034329 mailed Oct. 2, 2024, 16 pages.
Qin et al., "Recovery and Reuse of Spent LiFePO4 Batteries," Journal of New Materials for Electrochemical Systems, vol. 22, No. 3, Aug. 31, 2019, pp. 119-124.
Chen et al., "Recycling of Automobile Products", Shanghai Jiaotong University Press, Jan. 2017, pp. 289-290 and 296-297, with English translation of pertinent portions, 7 pages.
Chinese Office Action and Search Report for Chinese Application No. 201980089652.8, dated Mar. 23, 2022, 21 pages with English translation.
Chu-Ying et al. "First principles study on NaxLi1-xFePO4 as cathode material for rechargeable lithium batteries." Chinese Physics Letters 23.1 (2006): 61-64.
Extended European Search Report for European Application No. 19890650.5, dated Jul. 29, 2022, 8 pages.
Final Office Action for U.S. Appl. No. 18/314,873 mailed Jun. 27, 2024, 7 pages.
Gaines L, et al., "Lithium-ion battery recycling processes: Research towards a sustainable course" Sustainable Materials and Technologies, vol. 17, 2018, pp. 1-15.
International Preliminary Report on Patentability dated May 25, 2021, Written Opinion of the International Searching Authority, and International Search Report dated Feb. 6, 2020, for International Application No. PCT/US2019/063305, 9 pages.
International Search Report and Written Opinion for International Application No. PCT/US2023/021622, mailed on Sep. 27, 2023, 11 pages.
International Search Report and Written Opinion for PCT Application No. PCT/US2023/082935 dated Jun. 4, 2024, 19 pages.
Invitation to pay additional fees for International Application No. PCT/US2023/021622, dated Jul. 19, 2023, 3 pages.
Invitation to pay additional fees for International Application No. PCT/US2023/082935 dated Apr. 12, 2024, 9 pages.
Meethong et al. "Aliovalent substitutions in olivine lithium iron phosphate and impact on structure and properties." Advanced Functional Materials 19.7 (2009): 1060-1070.
Molenda et al. "Structural, transport and electrochemical properties of LifePO4 substituted in lithium and iron sublattices (Al, Zr, W, Mn, Co and Ni)." Materials 6.5 (2013): 1656-1687.
Non-Final Office Action for U.S. Appl. No. 18/131,637 dated Aug. 21, 2023, 4 pages.
Non-Final Office Action for U.S. Appl. No. 18/314,873 dated Feb. 8, 2024, 5 pages.
Non-Final Office Action for U.S. Appl. No. 18/314,873 dated Sep. 28, 2023, 6 pages.

(56) References Cited

OTHER PUBLICATIONS

Notice of Allowance for U.S. Appl. No. 17/298,276 dated Feb. 9, 2023, 8 pages.
Office Action for Chinese Application No. 201980089652.8 dated Feb. 8, 2023, 18 pages, with English translation.
Toby et al. "GSAS-II: the genesis of a modern open-source all purpose crystallography software package." Journal of Applied Crystallography 46.2 (2013): 544-549.
Xu et al. "Effects of doping on the electronic properties of LiFePO4: A first-principles investigation." Physica B: Condensed Matter 405.3 (2010): 803-807.
Office Action for Korean Application No. 10-2021-7019424 mailed Oct. 15, 2024, 16 pages, with English translation.

* cited by examiner

SYSTEMS AND METHODS FOR REMOVAL AND RECYCLING OF ALUMINUM IMPURITIES FROM BATTERY WASTE

CROSS-REFERENCE TO RELATED APPLICATIONS

The present application claims priority to and the benefit of U.S. Provisional Application No. 63/509,661, filed Jun. 22, 2023, and entitled "Systems and Methods for the Removal and Recycling of Aluminum Impurities from Battery Waste," the entire disclosure of which is hereby incorporated herein by reference.

TECHNICAL FIELD

Embodiments described herein relate to apparatus, systems, and methods for removing and recycling aluminum impurities from battery waste.

BACKGROUND

Lithium-ion batteries (LIBs) are widely implemented for portable electronic devices, electric vehicles, and grid energy storage due to their low self-discharge rate, high energy and power density, and long cycle life. The market for LIBs will continue to grow in the future. Among the cathode active materials, olivine-type lithium iron phosphate ($LiFePO_4$, also referred to as LFP), and its derivatives, have attracted much attention and have several distinct advantages over their counterparts. LFP and its derivatives, when used as cathode materials in LIBs, are intrinsically safer, cheaper, and highly durable when compared to other cathode materials. However, the LIB production process results in the formation of undesired by-products. Capture and use of these by-products can greatly improve the efficiency of the overall LIB production process.

SUMMARY

Embodiments described herein relate to removal of aluminum impurities from battery waste. In some aspects, a method for removing aluminum impurities includes preprocessing a quantity of battery waste to improve removal of aluminum impurities from the quantity of battery waste. The method further includes removing at least a portion of the aluminum impurities from the quantity of battery waste, modifying the removed aluminum impurities to form a coating precursor and/or a doping precursor, and applying the coating precursor and/or the doping precursor to an electrode material. In some embodiments, the method further includes characterizing the aluminum impurities in the quantity of battery waste and regenerating the electrode material. In some embodiments, the removing can be via sieving, cyclone separation, air separation, elutriation, and/or dissolution. In some embodiments, the doping precursor can include aluminum hydroxide ($Al(OH)_3$). In some embodiments, the regenerating includes applying a heat treatment to the electrode material.

In some embodiments, of recycling a battery waste that includes an electrode material and aluminum impurities, includes: modifying the aluminum impurities to form a precursor; and incorporating the precursor into the electrode material.

In some embodiments, a method of regenerating an electrode material includes: obtaining a battery waste, the battery waste including the electrode material and aluminum impurities; and regenerating the electrode material by incorporating at least a portion of the aluminum impurities into the electrode material.

DETAILED DESCRIPTION

Figure 1:
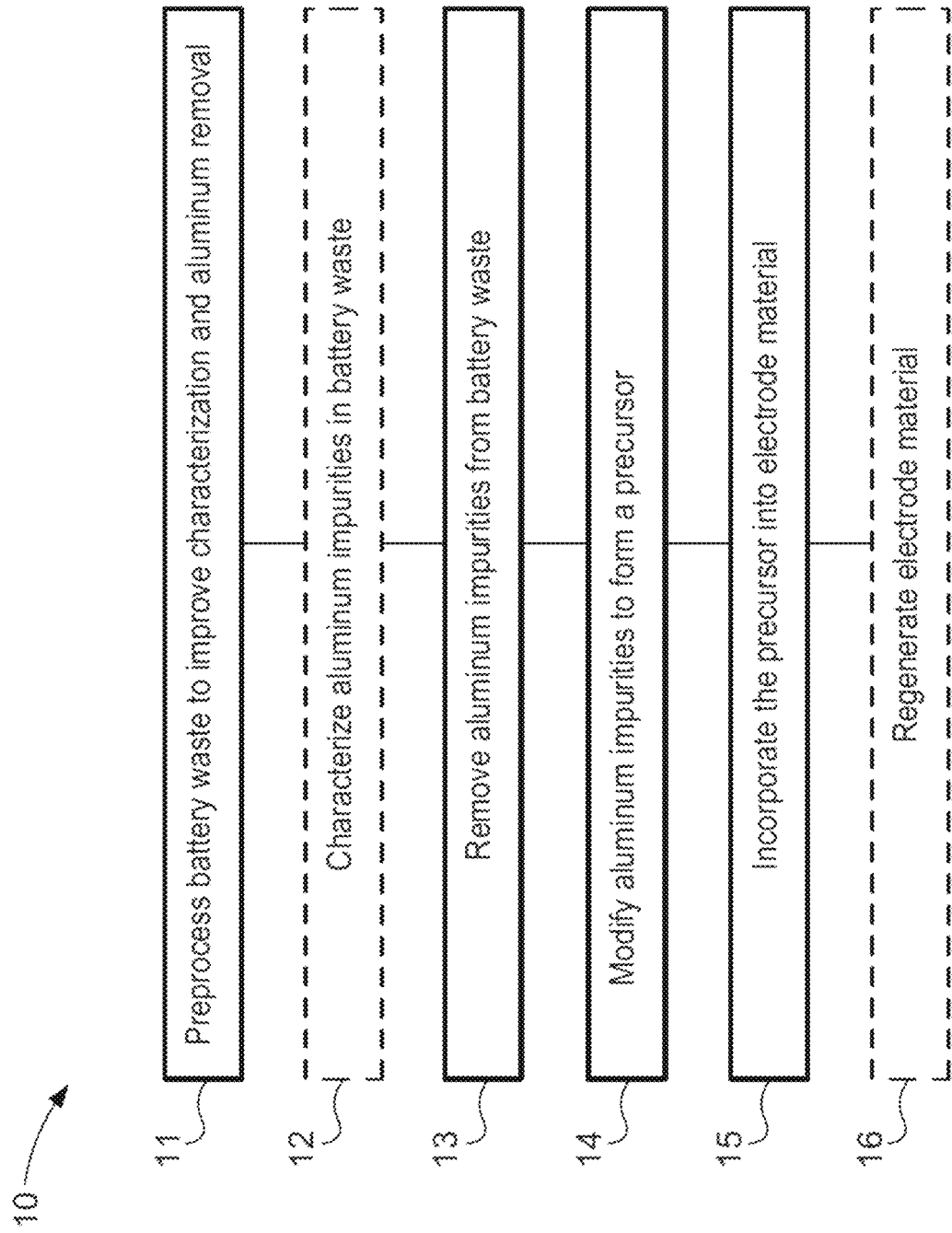
FIG. 1 is a flow diagram of a method of removing aluminum (Al) from battery waste, according to an embodiment.

Effective recycling of lithium-ion batteries can help recover materials for reuse. Such materials can be incorporated into the manufacture of new lithium-ion batteries. This can reduce greenhouse gas emissions, energy consumption, and economic costs associated with lithium-ion battery production. Direct recycling can recover valuable cathode materials in a non-destructive way and can preserve the structure, morphology, and electrochemical properties of electrode materials. Aluminum impurities in the electrode materials can originate from casing materials, degradation of previous aluminum-based additives or coating compounds, cutting/shredding machinery, and/or from aluminum current collectors. The presence of aluminum impurities in the electrode materials can lead to unsatisfactory electrochemical performance.

While lithium-ion batteries have become an important component in the introduction of sustainable energy technologies (e.g., solar and wind energy, electric vehicles), the manufacture, use, and disposal of lithium-ion batteries can generate significant waste. Recycling battery materials can reduce the environmental impact of lithium-ion batteries. In addition, recycled battery materials can be a significant source of battery materials entering new battery manufacturing processes. This can reduce the demand, the social environmental impact, and costs associated with the mining and manufacturing of new battery materials.

Direct recycling of battery waste is a method that can directly recover electrode materials as well as other battery waste (e.g., current collectors, binder, and electrolyte) for reuse. Direct recycling is non-destructive and preserves the structure, morphology, and electrochemical properties of valuable battery materials. In many cases, direct recycling can provide additional advantages over other recycling processes. These advantages can include modification or upcycling of battery materials to produce battery materials with improved morphology, structure, processing characteristics, safety characteristics, and electrochemical or other performance characteristics.

Systems and methods described herein relate to the direct recycling of batteries and battery waste. Direct recycling includes processing of batteries and battery waste over several steps to isolate, purify, and/or regenerate one or more recoverable battery components, such as electrode materials. Additionally, direct recycling can include procedures to incorporate impurities generated or introduced purposefully during the recycling process. Such impurities can include aluminum impurities. The introduction of these impurities into the recycled battery materials can prevent advantages in safety, processing characteristics, and performance.

As used in this specification, "battery waste" can include spent battery material, battery manufacturing waste, defect batteries, or subsets thereof. For example, battery waste can include electrode material, separator material, current collector material, electrolyte, lithium salts, packaging, or any combination thereof.

As used herein, "electrode material," can refer to active material, conductive material, binder, or any combination thereof. For example, electrode material can refer to active material only, active material and conductive material, active material and binder, conductive material and binder, or active material, conductive material, and binder. Electrode material can include anode materials and/or cathode materials. In some embodiments, the electrode material can include cathode active material, cathode conductive material, cathode binder cathode current collector material, or any combination thereof. In some embodiments, the electrode material can include anode active material, anode conductive material, anode binder, anode current collector material, or any combination thereof. For example, the electrode material can include cathode active material, cathode conductive material, cathode binder, cathode current collector material, anode active material, anode conductive material, anode binder, anode current collector material, or any combination thereof.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

Some embodiments described herein can include any of the recycling aspects of U.S. Pat. No. 11,631,909 ("the '909 patent"), filed Nov. 26, 2019 and titled "Methods and Systems for Scalable Direct Recycling of Batteries," the disclosure of which is hereby incorporated by reference in its entirety. Some embodiments described herein can include any of the recycling aspects of U.S. patent application Ser. No. 18/314,873 ("the '873 application"), filed May 10, 2023 and titled, "Methods and Systems for Scalable Direct Recycling of Battery Waste," the disclosure of which is hereby incorporated by reference in its entirety.

FIG. 1 is a flow diagram of a method 10 of removing and/or modifying aluminum (Al) from battery waste, according to an embodiment. As shown, the method 10 includes preprocessing battery waste to improve characterization, aluminum removal, and aluminum modification at step 11. The method 10 optionally includes characterizing aluminum impurities in the battery waste at step 12. The method 10 further includes removing aluminum impurities from the battery waste at step 13, modifying the aluminum impurities to form a precursor, for example, a coating and/or doping precursor, at step 14, and incorporating the precursor into the electrode material at step 15. The method 10 optionally includes regenerating the electrode material at step 16. In some embodiments, the method 10 can be performed in a system or facility, which can include one or more subsystems for execution of each method step. More specifically, step 11, step 12, step 13, step 14, step 15, and step 16 can each be performed within subsystems of the main system or facility.

In some embodiments, the battery waste processed via the method 10 can include an electrode material (e.g., a spent electrode material). In some embodiments, the electrode material can include $Li_xM_yPO_4$, where M is a transition metal and x and y are positive real numbers. In some embodiments, the electrode material can include LFP. In some embodiments, the electrode material can include a doped or mixed metal derivative of LFP (e.g., $LiM_xFe_{1-x}PO_4$, or $Li_{1-x}M_xPO_4$). In some embodiments, the battery waste can include waste from a lithium cobalt oxide (LCO) battery, a lithium nickel cobalt manganese oxide (NCM) battery, a lithium nickel cobalt aluminum oxide (NCA) battery, and/or a lithium manganese oxide (LMO) battery. In some embodiments, the electrode material can include $LiCoO_2$, $LiMn_2O_4$, $LiFe_tM_{1-t}PO_4$, or $LiNi_aMn_bCo_cA_dO_2$, wherein a+b+c+d=1; wherein 0<t<1; wherein M includes a metal element; and wherein A=Al, Zr, or Mg.

In some embodiments, the battery waste processed can include aluminum impurities in the form of aluminum oxide $(Al_2O_3)$, $(Al(OH)_3)$, or any combination thereof. In some embodiments, the method 10 can yield commercial-grade electrode materials. In some embodiments, the method 10 can yield electrode materials without any forms of aluminum. In some embodiments, the method 10 can yield electrode materials without aluminum impurities but with aluminum compound surface coating and/or aluminum doping.

Step 11 includes preprocessing battery waste to improve characterization, aluminum removal, and aluminum modification. The preprocessing prepares the electrode materials for efficient subsequent operations. In some embodiments, step 11 can include harvesting electrode materials from a battery waste stream. In some embodiments, the battery waste stream can include used, defect, scrap, or end-of-life lithium-ion batteries, or combinations thereof. In some embodiments, the battery waste stream can include electrode scrap materials. In some embodiments, the electrode scrap materials can include at least one electrode material. In some embodiments, the electrode scrap materials can include at least one current collector material. In some embodiments, the electrode scrap materials can include black mass or other shredded, ground, milled, sectioned, or otherwise mechanically processed battery waste. In some embodiments, the battery waste stream can include any combination of the aforementioned electrode forms. In some embodiments, the harvesting of the electrode materials can include any of the processes and instrumentations described in the '909 patent and the '873 application (e.g., washing, separation, sieving, flotation). In some embodiments, step 11 can include partially or fully removing other impurities in the electrode materials, such as anode, carbon, binder, electrolyte, casing materials, separator, aluminum, and/or copper. In some embodiments, step 11 can include downsizing the electrode materials as well as the aluminum impurities to generate a more uniform, homogeneous mixture. In some embodiments, the electrode materials and/or aluminum impurities can be downsized via methods such as shredding, cutting, milling, and/or crushing. In some embodiments, step 11 can include separating anode active material, anode conductive material, anode binder, or any combination thereof from other battery waste components. In some embodiments, step 11 can include separating cathode active material, cathode conductive material, cathode binder, or any combination thereof from other battery waste components. In some embodiments, step 11 can include separating cathode active material, cathode conductive material, cathode binder, anode active material, anode conductive material, anode binder, or any combination thereof from other battery waste components.

Step 11 can include isolation and recovery of electrode material (e.g., active material with binder and/or conductive material with impurities, etc.). Step 12 and subsequent steps may be applicable if the material is still battery waste (i.e., includes electrode materials and other components such as separator material and/or current collector material) at the end of step 11.

At step 12, the method 10 optionally includes characterizing the aluminum impurities in the battery waste. This characterization can aid in understanding the morphology, crystal structure, chemical composition, oxidation status, and/or any other properties of the aluminum impurities in the electrode materials. In some embodiments, the characterization can include the use of a scanning electron microscope (SEM) to analyze the surface morphology and/or distribution of the aluminum impurities among the electrode materials. In some embodiments, in conjunction with the scanning electron microscope, energy dispersive X-ray spectroscopy (EDX or EDS) can be used to assess the weight percentages of the aluminum impurities in the electrode materials. In some embodiments, the characterization can include inductively coupled plasma mass spectrometry (ICP-MS) or similar analysis on the solutions with dissolved electrode materials to assess the weight percentage of the aluminum impurities. In some embodiments, the characterization can include an X-ray fluorescence (XRF) based analytical technique to determine the amount of aluminum impurities in the electrode materials. In some embodiments, the characterization of aluminum impurities can be performed via any combination of the aforementioned techniques.

Step 13 includes removing most or all of the aluminum impurities from the electrode material, for example, substantially all of the aluminum impurities from the electrode material (e.g., greater than 95% of aluminum impurities from the electrode material). In some embodiments, the aluminum impurities can be removed from the electrode material physically based on the physical properties of the aluminum impurities. In some embodiments, these physical properties can include shape, density, and/or particle size. In some embodiments, the aluminum impurities can be removed from the electrode material via a screening surface (e.g., screening, sieving, and/or sifting). In some embodiments, the aluminum impurities can be removed from the electrode material via a cyclone separator and/or an air separator. In some embodiments, the aluminum impurities can be removed via elutriation methods. In some embodiments, the aluminum impurities can be removed chemically from the electrode material. In some embodiments, the aluminum impurities can be dissolved via an alkaline solution and then removed from the electrode material (e.g., via filtration). In some embodiments, the alkaline solution can react with the aluminum impurities without reacting with or changing the properties of the other components of the electrode material. In some embodiments, the aluminum impurities can be dissolved via sodium hydroxide (NaOH) and/or potassium hydroxide (KOH) solutions. In some embodiments, the alkaline solution can be an aqueous solution. In some embodiments, the alkaline solution can have a pH of at least about 8, at least about 8.5, at least about 9, at least about 9.5, at least about 10, at least about 10.5, at least about 11, at least about 11.5, at least about 12, at least about 12.5, at least about 13, at least about 13.5, or at least about 14. The dissolution of aluminum in a NaOH solution generates hydrogen gas and soluble sodium aluminate ($NaAlO_2$).

In some embodiments, the aluminum impurities can be dissolved in a lithium hydroxide (LiOH) solution. In some embodiments, the LiOH solution can have a pH of at least about 8, at least about 8.5, at least about 9, at least about 9.5, at least about 10, at least about 10.5, at least about 11, at least about 11.5, at least about 12, at least about 12.5, at least about 13, at least about 13.5, or at least about 14. In some embodiments, the ratio of the moles of lithium in the LiOH solution to the moles of aluminum in the electrode material can be at least about 5:1, at least about 6:1, at least about 7:1, at least about 8:1, at least about 9:1, at least about 10:1, at least about 11:1, at least about 12:1, at least about 13:1, at least about 14:1, or at least about 15:1. In some embodiments, any combination of the aforementioned alkaline solutions can be used to dissolve and remove aluminum impurities from the electrode material.

In some embodiments, the aluminum impurities can be dissolved via an acid solution (or combination or sequence of acid solutions) and then removed from the electrode material (e.g., via filtration). In some embodiments, the acid solution can react with the aluminum impurities without reacting with or changing the properties of the other components of the electrode material. In some embodiments, the removal of aluminum impurities is conducted in a controlled environment to protect the electrode materials. In some embodiments, a reducing environment is created to prevent the oxidation of electrode materials (e.g., LFP electrode materials and their derivatives). In some embodiments, the aluminum impurities can be dissolved via inorganic acid, including but not limited to, hydrochloric acid (HCl), sulfuric acid ($H_2SO_4$), nitric acid ($HNO_3$) and/or phosphoric acid ($H_3PO_4$) solutions, and organic acid, including but not limited to, acetic acid, citric acid, and/or oxalic acid. In some embodiments, the alkaline solution can be an aqueous solution. In some embodiments, the acid solution can have a pH of no more than about 6, more than about 5.5, no more than about 5, no more than about 4.5, no more than about 4, no more than about 3.5, no more than about 3, no more than about 2.5, no more than about 2, no more than about 1.5, no more than about 1, or no more than about 0.5.

In some embodiments, the removal of aluminum impurities from the electrode material at step 13 can have a duration of at least about 30 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, at least about 55 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 14 hours, at least about 16 hours, at least about 18 hours, or at least about 20 hours. In some embodiments, the removal of aluminum impurities from the electrode material at step 13 can have a duration of no more than about 21 hours, no more than about 19 hours, no more than about 17 hours, no more than about 15 hours, no more than about 13 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, or no more than about 1 minute. Combinations of the above-referenced durations are also possible (e.g., at least about 30 seconds and no more than about 21 hours or at least about 5 minutes and no more than about 30 minutes), inclusive of all values and ranges therebetween. In some embodiments, the removal of aluminum impurities from the electrode material at step 13 can have a duration of about 30 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, or about 21 hours.

In some embodiments, the removal of aluminum from the electrode material at step 13 can be accelerated by techniques including, but not limited to, heating, ultrasonication, and stirring. In some embodiments, the removal of aluminum at step 13 can be performed at a temperature of at least about 20° C., at least about 30° C., at least about 40° C., at least about 50° C., at least about 60° C., at least about 70° C., at least about 80° C., or at least about 90° C. In some embodiments, the aluminum removal at step 13 can be performed at a temperature of no more than about 100° C., no more than about 90° C., no more than about 80° C., no more than about 70° C., no more than about 60° C., no more than about 50° C., no more than about 40° C., or no more than about 30° C. Combinations of the above-referenced temperatures are also possible (e.g., at least about 20° C. and no more than about 100° C. or at least about 40° C. and no more than about 60° C.), inclusive of all values and ranges therebetween. In some embodiments, the removal of aluminum at step 13 can be performed at a temperature of about 20° C., about 30° C., about 40° C., about 50° C., about 60° C., about 70° C., about 80° C., about 90° C., or about 100° C.

In some embodiments, the alkaline solution with dissolved aluminum compounds can be separated from the electrode material via techniques including, but not limited to filtration, centrifugation, sedimentation, decanting, or a combination thereof. In some embodiments, the electrode material can be washed with water and/or another solvent at least once to remove residual alkaline solution. In some embodiments, the aluminum impurities can be partially or entirely removed from the electrode materials using a combination of the aforementioned methods.

In some embodiments, the acid solution with dissolved aluminum compounds can be separated from the electrode material via techniques including, but not limited to filtration, centrifugation, sedimentation, decanting, or a combination thereof. In some embodiments, the electrode material can be washed with water and/or another solvent at least once to remove residual alkaline solution. In some embodiments, the aluminum impurities can be partially or entirely removed from the electrode materials using a combination of the aforementioned methods.

In some embodiments, after step 13, the battery waste can include less than about 10 wt %, less than about 5 wt %, less than about 1 wt %, less than about 0.5 wt %, less than about 0.1 wt %, less than about 0.05 wt %, less than about 0.01 wt %, less than about 0.005 wt %, less than about 0.001 wt %, less than about 0.0005 wt %, less than about 0.0001 wt % aluminum. In some embodiments, after step 13, the electrode material of the battery waste can include less than about 10 wt %, less than about 5 wt %, less than about 1 wt %, less than about 0.5 wt %, less than about 0.1 wt %, less than about 0.05 wt %, less than about 0.01 wt %, less than about 0.005 wt %, less than about 0.001 wt %, less than about 0.0005 wt %, less than about 0.0001 wt % aluminum. In some embodiments, after step 13, the aluminum concentration in the battery waste or the electrode material can be decreased to a desired concentration for the subsequent aluminum modification (i.e., step 14).

In some embodiments, step 13 includes partial removal of aluminum impurities, and then the rest of the aluminum impurities are directly converted to aluminum coating and/or doping of the electrode materials after a coating/doping operation (i.e., step 14). The remaining aluminum impurities can be modified to form aluminum precursors via the methods described herein. Then, the aluminum precursors can be converted to aluminum coating and/or doping for the electrode materials after a coating and/or doping operation (i.e., step 14). In some embodiments, aluminum precursors can include any aluminum-containing compound that is used to form a doping or coating. Aluminum precursors can be considered active compounds in that they can readily react with an electrode material (e.g., the cathode) upon application of a stimulant, such as lowering or raising temperature, decreasing or increasing pressure, adding solvent, or adding a catalyst or other reactive compound. In some embodiments, the aluminum impurities can be modified to form aluminum precursors. Some of the aluminum impurities can have forms not readily or less reactive with the cathode material (e.g., $Al_2O_3$). These can potentially be converted into more reactive aluminum-containing compounds (i.e., aluminum precursors) to be doped and coated onto the cathode. The aluminum precursors can be converted to aluminum coating and/or doping of the electrode materials after a coating and/or doping operation. In some embodiments, the aluminum impurities can be directly converted to aluminum coating and/or doping of the electrode materials after a coating/doping operation (i.e., after step 15).

Step 14 includes modifying the aluminum impurities to form a precursor, for example, a coating and/or a doping precursor. For example, the aluminum impurities can be converted to an aluminum-based doping material for doping into the lattice of electrode materials. In some embodiments, the aluminum impurities can be converted into a surface coating and doping of the recycled electrode materials. In some embodiments, the aluminum impurities can be converted into an aluminum compound that is the precursor for surface coating and/or doping. These precursors of surface coating and/or doping are then coated and/or doped to the electrode materials via techniques such as heat treatment, mechanical fusion, and mechano-chemical reactions. In some embodiments, the concentration of aluminum impurities in the dopant and/or coating can be reduced to a desired level via the aluminum impurity removal steps described above with reference to step 13. In some embodiments, the concentration of aluminum in the dopant and/or coating can be increased by adding aluminum compounds or tailoring the amount of aluminum removed during step 13. In some embodiments, the concentration of aluminum impurities in the dopant and/or coating can be increased to a desired level by adding extra aluminum sources, such as aluminum metal and/or aluminum-containing compounds to the electrode materials during step 14. In some embodiments, the aluminum can be doped to an LFP electrode at the site of a lithium atom (i.e., M1 site) with a composition of $Li_{1-3y}Al_yFePO_4$. In some embodiments, the aluminum can be doped at the site of an iron atom (i.e., M2 site) with a composition of $LiFe_{1-1.5y}Al_yPO_4$.

In some embodiments, other precursors or one or more additional precursors for electrode materials production, such as $Li_2CO_3$, LiOH, $FePO_4$, $(NH_4)_2HPO_4$, can be added during the Al modification step to achieve the target doping composition. In some embodiments, the additional precursor(s) may include a lithium precursor, for example, $Li_2CO_3$, LiOH, or any other suitable lithium precursor, or any suitable combination thereof. In such embodiments, the lithium precursor may react or interact with the aluminum precursor to modify or convert at least a portion of the aluminum precursor into a lithium-aluminum (Li—Al) compound precursor, and/or directly be incorporated into the electrode material (e.g., cathode material) to relithiate the electrode material (e.g., incorporate lithium ions, dope, and/or coat the electrode material. In other words, the lithium precursor may cause the Li—Al compound and/or lithium to incorporate into the electrode material.

In some embodiments, the coating and/or dopant can have an aluminum concentration of at least about 1 wt %, at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, at least about 99 wt %, at least about 99.5 wt %, at least about 99.6 wt %, at least about 99.7 wt %, at least about 99.8 wt %, at least about 99.9 wt %, at least about 99.99 wt %, or at least about 99.999 wt %. In some embodiments, the coating and/or dopant can be pure aluminum. In some embodiments, the coating and/or dopant can have an aluminum concentration of no more than about 99.999 wt %, no more than about 99.99 wt %, no more than about 99.9 wt %, no more than about 99.8 wt %, no more than about 99.7 wt %, no more than about 99.6 wt %, no more than about 99.5 wt %, no more than about 99 wt %, no more than about 98 wt %, no more than about 97 wt %, no more than about 96 wt %, no more than about 95 wt %, no more than about 90 wt %, no more than about 85 wt %, no more than about 80 wt %, no more than about 75 wt %, no more than about 70 wt %, no more than about 65 wt %, no more than about 60 wt %, no more than about 55 wt %, no more than about 50 wt %, no more than about 45 wt %, no more than about 40 wt %, no more than about 35 wt %, no more than about 30 wt %, no more than about 25 wt %, no more than about 20 wt %, no more than about 15 wt %, no more than about 10 wt %, or no more than about 5 wt %. Combinations of the above-referenced weight percentages are also possible (e.g., at least about 1 wt % and no more than about 99.999 wt % or at least about 15 wt % and no more than about 40 wt %), inclusive of all values and ranges therebetween. In some embodiments, the coating and/or dopant can have an aluminum concentration of about 1 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, about 99 wt %, about 99.5 wt %, about 99.6 wt %, about 99.7 wt %, about 99.8 wt %, about 99.9 wt %, about 99.99 wt %, or about 99.999 wt %.

In some embodiments, the aluminum impurities can be converted into a lithium/aluminum layered double hydroxide compound as a doping precursor. In some embodiments, the aluminum impurities can be converted into a lithium/aluminum layered double hydroxide compound by first reacting the aluminum impurities with a LiOH solution. In some embodiments, the LiOH solution can have a pH of at least about 8, at least about 8.5, at least about 9, at least about 9.5, at least about 10, at least about 10.5, at least about 11, at least about 11.5, at least about 12, at least about 12.5, at least about 13, at least about 13.5, or at least about 14 to react with the aluminum impurities. In some embodiments, metallic aluminum can react with the LiOH solution to form a lithium-aluminum layered double hydroxide having the formula $[LiAl_2(OH)_6]OH·H_2O$. In some embodiments, the lithium-aluminum layered double hydroxide can generate hydrogen gas. In some embodiments, $Al_2O_3$ can react with the LiOH solution to form a lithium/aluminum layered double hydroxide having the formula $[LiAl_2(OH)_6]OH·H_2O$. In some embodiments, the molar ratio of aluminum to lithium in the conversion reaction can be less than about 2. The lithium/aluminum layered double hydroxide can form, and excess lithium can remain as LiOH in the solution. In some embodiments, the aluminum to lithium molar ratio for the conversion reaction can be about 2. In some embodiments, only the lithium/aluminum layered double hydroxide forms at the end of the reaction and no additional soluble lithium is present in the reaction medium. In some embodiments, the aluminum to lithium molar ratio for the conversion reaction can be greater than about 2. In some embodiments, the lithium/aluminum layered double hydroxide and aluminum hydroxide can form at the end of the reaction.

In some embodiments, the conversion reaction between aluminum and LiOH can be accelerated via techniques including, but not limited to, heating, ultrasonication, and stirring. In some embodiments, the conversion reaction can be performed at a temperature of at least about 20° C., at least about 30° C., at least about 40° C., at least about 50° C., at least about 60° C., at least about 70° C., at least about 80° C., or at least about 90° C. In some embodiments, the conversion reaction can be performed at a temperature of no more than about 100° C., no more than about 90° C., no more than about 80° C., no more than about 70° C., no more than about 60° C., no more than about 50° C., no more than about 40° C., or no more than about 30° C. Combinations of the above-referenced temperatures are also possible (e.g., at least about 20° C. and no more than about 100° C. or at least about 40° C. and no more than about 60° C.), inclusive of all values and ranges therebetween. In some embodiments, the conversion reaction can be performed at a temperature of about 20° C., about 30° C., about 40° C., about 50° C., about 60° C., about 70° C., about 80° C., about 90° C., or about 100° C.

The LiOH solution (either in the form of lithium/aluminum layered double hydroxide or LiOH after the conversion reaction) can also serve as a lithium source to compensate for the lithium deficiency of the electrode materials via a regeneration step, as described below. In some embodiments, the amount of lithium in the added LiOH solution can be a stoichiometric amount to match with the aluminum doped composition (i.e., $Li_{1-3y}Al_yFePO_4$ or $LiFe_{1-1.5y}Al_yPO_4$). In some embodiments, liquids can be evaporated from the solution after the conversion reaction. In some embodiments, the precursors of surface coating and/or doping can be downsized and/or thoroughly mixed before beginning the coating and/or doping operation. In some embodiments, the downsizing and/or mixing can be performed with equipment such as a planetary ball mill a horizontal ball mill, a nano bead mill, an air jet mill, and/or other similar grinding, milling, or shredding processes, or a combination thereof.

In some embodiments, the aluminum impurities can be converted into $Al(OH)_3$ as a doping precursor. In some embodiments, the aluminum impurities can be converted into $Al(OH)_3$ by first reacting with a KOH and/or a NaOH solution. In some embodiments, the KOH solution and/or the NaOH solution can have a pH of at least about 8, at least about 8.5, at least about 9, at least about 9.5, at least about 10, at least about 10.5, at least about 11, at least about 11.5, at least about 12, at least about 12.5, at least about 13, at least about 13.5, or at least about 14 to react with the aluminum impurities. In some embodiments, metallic aluminum can react with the NaOH solution to form soluble $NaAlO_2$ and generate hydrogen gas. In some embodiments, $Al_2O_3$ can react with the NaOH solution to form soluble sodium aluminate ($NaAl(OH)_4$) and/or potassium aluminate ($KAl(OH)_4$). In some embodiments, the soluble $NaAl(OH)_4$ and/or $KAl(OH)_4$ can then react with carbon dioxide to form soluble sodium carbonate ($Na_2CO_3$) and/or soluble potassium carbonate ($K_2CO_3$). In some embodiments, the reaction with carbon dioxide can form soluble sodium bicarbonate ($NaHCO_3$) and/or soluble potassium bicarbonate ($KHCO_3$). In some embodiments, the soluble $NaAl(OH)_4$ and/or $KAl(OH)_4$ can also react with acids (e.g., HCl, $H_2SO_4$, or organic acids such as acetic acid, oxalic acid) to produce $Al(OH)_3$ precipitation. The solubility of $Al(OH)_3$ reaches its lowest at pH around 7. In some embodiments, the pH of the solution can be adjusted to about 7 (e.g., between about 6 and about 8, between about 5 and about 9, between about 5 and about 8, or between about 6 and about 9) to increase the efficiency or quantity of $Al(OH)_3$ precipitation.

In some embodiments, pH can be used as a determinative factor to indicate the completion of the conversion reaction. For example, the conversion reaction can end when the pH of the solution is less than about 13, less than about 12.5, less than about 12, less than about 11.5, less than about 11, less than about 10.5, less than about 10, less than about 9.5, less than about 9, less than about 8.5, less than about 8, less than about 7.5, or less than about 7, inclusive of all values and ranges therebetween. In some embodiments, the precipitation of aluminum from the solution can be controlled by appropriately controlling the pH of the solution. The control of aluminum precipitation can provide an alternative path to reach the desired chemical composition (e.g., $Li_{1-3y}Al_yFePO_4$ or $LiFe_{1-1.5y}Al_yPO_4$) for the resultant aluminum-doped electrode materials. After the $Al(OH)_3$ precipitation, the solution can be removed, leaving the $Al(OH)_3$ precursor and the electrode materials. In some embodiments, the solution can include soluble sodium and/or potassium-containing salts (e.g., NaOH, KOH, $NaAlO_2$, $KalO_2$, $Na_2CO_3$, $K_2CO_3$, $NaHCO_3$, and $KHCO_3$). In some embodiments, the liquid can be separated from the aluminum-containing material via filtration, centrifugation, sedimentation, decanting, or any combination thereof. In some embodiments, the mixture of electrode materials and the $Al(OH)_3$ precursors are washed with water or other solvent at least one time to remove the residual sodium and/or potassium salts in the mixture. In some embodiments, surface coating and/or doping precursors can be downsized and/or thoroughly mixed before entering the coating and/or doping operation. In some embodiments, the downsizing and/or mixing can be performed via equipment such as a planetary ball mill, a horizontal ball mill, a nano bead mill, an air jet mill, or any combination thereof.

In some embodiments, the metallic aluminum can be converted to an aluminum alkoxide ($Al(RO)_3$) as a doping precursor, where R is an alkyl group (e.g., methyl, ethyl, propyl). In some embodiments, the metallic aluminum can be converted to an aluminum alkoxide ($Al(RO)_3$) by reacting the metallic aluminum with organic compounds with at least one hydroxyl (—OH) functional group (i.e., alcohol). In some embodiments, the organic compound can include methanol ($CH_3OH$). Metallic aluminum can react with methanol to form aluminum methoxide ($Al(OCH_3)_3$), which can function as a doping precursor. In some embodiments, the organic compound can include ethanol ($C_2H_5OH$). Metallic aluminum can react with ethanol to form aluminum ethoxide ($Al(OC_2H_5)_3$), which can function as a doping precursor. In some embodiments, the organic compound can include n-propanol or isopropyl alcohol ($C_3H_7OH$). Metallic aluminum can react with n-propanol or isopropyl alcohol to form aluminum isopropoxide ($Al(O-i-Pr)_3$), which can function as a doping precursor, where i-Pr is the isopropyl group (—$CH(CH_3)_2$). In some embodiments, surface coating and/or doping precursors are downsized and/or thoroughly mixed before entering the coating and/or doping operation. In some embodiments, the downsizing and/or mixing is performed with equipment such as a planetary ball mill, a horizontal ball mill, a nano bead mill, an air jet mill, other grinding, shredding or milling processes, or a combination thereof.

In some embodiments, the aluminum impurities can be converted to $LiAlO_2$ as a coating precursor. In some embodiments, the aluminum impurities are converted into $LiAlO_2$ by first reacting with oxygen. In some embodiments, metallic aluminum can react with oxygen to form $Al_2O_3$. In some embodiments, $Al_2O_3$ and/or $Al(OH)_3$ can react with additional lithium sources (e.g., LiOH, $Li_2CO_3$) to form $LiAlO_2$. In some embodiments, the additional lithium sources can include LiOH, $Li_2CO_3$, or any combination thereof. In some embodiments, the amount of lithium source added exceeds the stoichiometric amount to react with the $Al_2O_3$ and/or $Al(OH)_3$. In some embodiments, the excessive amount of lithium source added can compensate for the lithium deficiency in the electrode materials to be regenerated. In some embodiments, the amount of lithium source added can be about 1.1, about 1.2, about 1.3, about 1.4, about 1.5, about 1.6, about 1.7, about 1.8, about 1.9, about 2, about 2.5, about 3, about 3.5, about 4, about 4.5, about 5, about 5.5, about 6, about 6.5, about 7, about 7.5, about 8, about 8.5, about 9, about 9.5, or about 10 times the stoichiometric amount to react with the $Al_2O_3$ and/or $Al(OH)_3$, inclusive of all values and ranges therebetween.

In some embodiments, the $Al_2O_3$ and/or $Al(OH)_3$ react with the lithium source at a temperature of at least about 400° C., at least about 450° C., at least about 500° C., at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., at least about 1,100° C., or at least about 1,150° C. In some embodiments, the $Al_2O_3$ and/or $Al(OH)_3$ react with the lithium source at a temperature of no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., or no more than about 600° C., no more than about 550° C., no more than about 500° C., or no more than about 450° C. Combinations of the above-referenced temperatures are also possible (e.g., at least about 400° C. and no more than about 1,200° C. or at least about 600° C. and no more than about 1,000° C.), inclusive of all values and ranges therebetween. In some embodiments, the $Al_2O_3$ and/or $Al(OH)_3$ react with the lithium source at a temperature of about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., or about 1,200° C.

In some embodiments, the reaction to form the $LiAlO_2$ is carried out in a controlled atmosphere such as oxidizing environment, an inert environment, or a reducing environment. In some embodiments, the metallic aluminum can be converted into aluminum an aluminum alkoxide such as aluminum isopropoxide $(Al(O-i-Pr)_3)$ as described above. In some embodiments, the aluminum alkoxide $(Al(RO)_3)$ then reacts with additional lithium sources, such as lithium carbonate and/or lithium hydroxide to form a $LiAlO_2$ precursor. In some embodiments, surface coating and/or doping precursors can be downsized and/or thoroughly mixed before entering the coating and/or doping operation. In some embodiments, the downsizing and/or mixing is performed with equipment such as a planetary ball mill, a horizontal ball mill, a nano bead mill, an air jet mill, other grinding, shredding or milling processes, or a combination thereof.

Step 15 includes incorporating, for example, applying, the precursor (e.g., the coating and/or doping precursor) to the electrode material. The application of the coating and/or the doping precursor can improve the performance of the electrode material. In some embodiments, the coating and/or doping can be executed via a heat treatment. In some embodiments, the coating precursors are uniformly mixed or distributed at the surface of the electrode materials via additional processing steps such as shredding, milling, crushing, and/or mechanical fusion.

In some embodiments, the doping and/or coating can be executed at a temperature of at least about 400° C., at least about 450° C., at least about 500° C., at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., at least about 1,100° C., or at least about 1,150° C. In some embodiments, the doping or coating can be executed at a temperature of no more than about 1,200° C., no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., or no more than about 600° C., no more than about 550° C., no more than about 500° C., or no more than about 450° C. Combinations of the above-referenced temperatures are also possible (e.g., at least about 400° C. and no more than about 1,200° C. or at least about 600° C. and no more than about 1,000° C.), inclusive of all values and ranges therebetween. In some embodiments, the doping and/or coating can be executed at a temperature of about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., or about 1,200° C.

In some embodiments, the doping and/or coating can be performed in a controlled gas environment. In some embodiments, the gas environment can be inert. In some embodiments, the gas environment can include nitrogen, argon, neon, or other similar inert environments. In some embodiments, the gas environment can include $CO_2$. In some embodiments, the gas environment can be a reducing environment. In some embodiments, the gas environment can include $H_2$, a mixture of Ar and $H_2$, a mixture of $N_2$ and $H_2$, a mixture of $CO_2$ and CO, or any combination thereof. In some embodiments, the gas environment can include an oxidizing environment. An oxidizing environment can assist in the removal of organic compounds. In some embodiments, air or other aforementioned gas flows along or through the battery waste during the purification. In some embodiments, no gas flows along or through the battery waste during the purification. In some embodiments, the surface treatment can be performed at positive (i.e., greater than atmospheric) gas pressure (e.g., about 0.05 bar (gauge), about 0.1 bar, about 0.2 bar, about 0.3 bar, about 0.4 bar, about 0.5 bar, about 0.6 bar, about 0.7 bar, about 0.8 bar, about 0.9 bar, or about 1 bar, inclusive of all values and ranges therebetween). In some embodiments, the surface treatment can be performed under negative (i.e., less than atmospheric) gas pressure (e.g., about −0.05 bar (gauge), about −0.1 bar, about −0.2 bar, about −0.3 bar, about −0.4 bar, about −0.5 bar, about −0.6 bar, about −0.7 bar, about −0.8 bar, about −0.9 bar, or about −1 bar, inclusive of all values and ranges therebetween). In some embodiments, reductants or oxidizers can be added and mixed thoroughly with the electrode materials before the doping and/or coating operation to create a reducing or oxidizing environment.

Step 16 is optional and includes regenerating the electrode material. The regeneration can aid in recovering structural defects or compositional losses from the electrode material. In some embodiments, the regeneration can include a heat treatment. In some embodiments, the heat treatment increases the purity of the electrode material by thermally decomposing or vaporizing carbon or other organic compounds present in the electrode material. In some embodiments, the regeneration can include a relithiation process to compensate for lithium losses from the electrode material. In some embodiments, the relithiation of the electrode material can be completed via solid-state synthesis during the heat treatment. In some embodiments, the relithiation process can include homogeneously mixing the electrode materials with one or more types of lithium sources, (e.g., $Li_2CO_3$, LiOH, lithium hydroxide monohydrate ($LiOH\text{---}H_2O$)), prior to the heat treatment. In some embodiments, the lithium source can be mixed thoroughly with the electrode material.

In some embodiments, the regeneration of the electrode material can be executed via a coating process. The coating process can include the regeneration of electrode materials. In some embodiments, the coating can be performed in isolation with no other regeneration operations in a direct recycling system. In some embodiments, the coating can be performed in combination with other regeneration operations in a direct recycling system. In some embodiments, the regeneration of the electrode material can be executed via a doping process. In some embodiments, the doping process can be performed in isolation with no other regeneration operation. In some embodiments, the doping can be performed in combination with other regeneration operations. This can include at least one doping operation followed by at least one regeneration operation. In some embodiments, the aluminum impurities or at least a portion of the aluminum impurities can be directly converted to the surface coating and/or doping of the electrode materials without converting to any coating and/or doping precursors. In other words, the method 10 can skip from step 12 to step 16 without removing the aluminum impurities or applying a doping/coating precursor. In some embodiments, the aluminum impurities or at least a portion of the aluminum impurities are converted to a coating and/or doping via a high-intensity, high-speed, or high-energy mixer or mechanical fusion device.

In some embodiments, the regeneration can be performed at a temperature of at least 400° C., at least 450° C., at least 500° C., at least 550° C., at least 600° C., at least 650° C., at least 700° C., at least 750° C., at least 800° C., at least 850° C., at least 900° C., at least 950° C., at least 1000° C., at least 1050° C., and at least 1100° C. In some embodiments, the regeneration can be performed at a temperature of no more than about 1200° C., no more than about 1100° C., no more than about 1050° C., no more than about 1000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., or no more than about 450° C. Combinations of the above-referenced temperatures are also possible (e.g., at least about 400° C. and no more than about 1200° C. or at least about 500° C. and no more than about 550° C.), inclusive of all values and ranges therebetween. In some embodiments, the regeneration can be performed at a temperature of about 400° C., about 500° C., about 600° C., about 700° C., about 800° C., about 900° C., about 1,000° C., about 1,100° C., or about 1,200° C.

In some embodiments, the regeneration can be performed in a controlled gas environment. In some embodiments, the gas environment can be inert. In some embodiments, the gas environment can include nitrogen, argon, neon, or other similar inert environments. In some embodiments, the gas environment can include $CO_2$. In some embodiments, the gas environment can be a reducing environment. In some embodiments, the gas environment can include $H_2$, a mixture of Ar and $H_2$, a mixture of $N_2$ and $H_2$, a mixture of $CO_2$ and CO, or any combination thereof. In some embodiments, the gas environment can include an oxidizing environment. An oxidizing environment can assist in the removal of organic compounds. In some embodiments, air or other aforementioned gas flows along or through the battery waste during the purification. In some embodiments, no gas flows along or through the battery waste during the purification. In some embodiments, the surface treatment can be performed at positive (i.e., greater than atmospheric) gas pressure (e.g., about 0.05 bar (gauge), about 0.1 bar, about 0.2 bar, about 0.3 bar, about 0.4 bar, about 0.5 bar, about 0.6 bar, about 0.7 bar, about 0.8 bar, about 0.9 bar, or about 1 bar, inclusive of all values and ranges therebetween). In some embodiments, the surface treatment can be performed under negative (i.e., less than atmospheric) gas pressure (e.g., about −0.05 bar (gauge), about −0.1 bar, about −0.2 bar, about −0.3 bar, about −0.4 bar, about −0.5 bar, about −0.6 bar, about −0.7 bar, about −0.8 bar, about −0.9 bar, or about −1 bar, inclusive of all values and ranges therebetween). In some embodiments, reductants or oxidizers can be added and mixed thoroughly with the electrode materials before the regeneration operation to create a reducing or oxidizing environment.

EXAMPLES

LFP was first chemically delithiated by reacting with a stoichiometric amount of sodium persulfate in an aqueous solution to form $Li_{0.92}FePO_4$ and $Li_{0.83}FePO_4$. The delithiated LFP materials were washed two times with water to remove any residual sodium salts. The chemical composition of the delithiated LFP materials, as well as the standard LFP materials, were analyzed by inductively coupled plasma mass spectrometry (ICP-MS), and the results are shown in TABLE 1.

TABLE 1

| ICP-MS results of delithiated LFP materials and standard LFP materials. | | |
|---|---|---|
| | Theoretical composition | Composition from ICP |
| Untreated LFP | $LiFePO_4$ | $Li_{0.986}Fe_{0.901}PO_4$ |
| 8% deficient LFP | $Li_{0.92}FePO_4$ | $Li_{0.925}Fe_{0.903}PO_4$ |
| 17% deficient LFP | $Li_{0.83}FePO_4$ | $Li_{0.828}Fe_{0.907}PO_4$ |

Aluminum, either separately or mixed in with the aforementioned delithiated LFP materials, was dissolved in a 0.5 M NaOH solution. After the complete dissolution of Al, $CO_2$ was pumped into the solution, and the formation of white $Al(OH)_3$ precipitate powder was observed. The pumping of $CO_2$ was terminated when the pH of the solution reached 7. The white $Al(OH)_3$ precipitate powder (and the mixed-in delithiated LFP materials when applicable) was collected via filtration. The collected powder was washed two times with water to remove the residual sodium salts.

Figure 2:
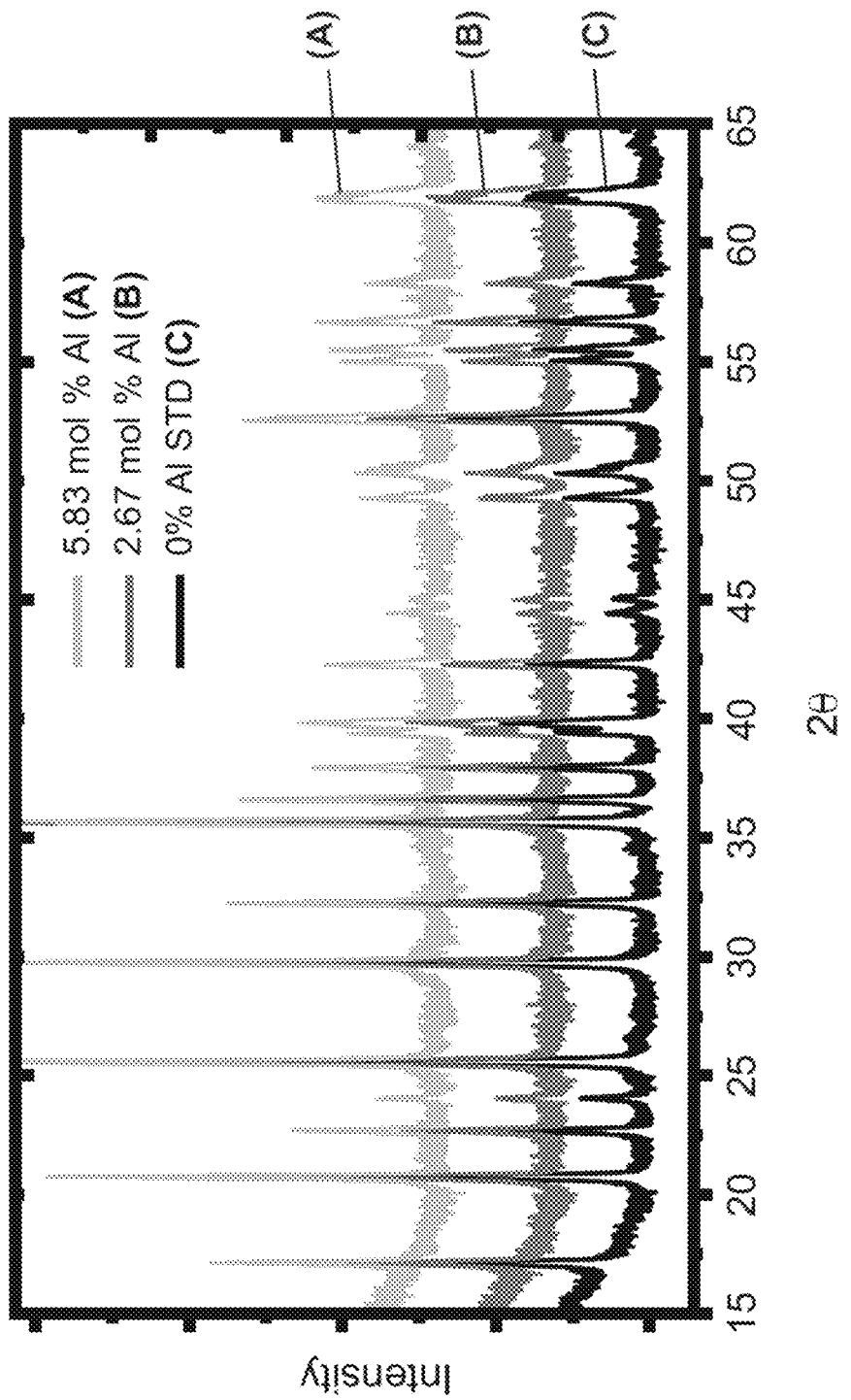
FIG. 2 shows an X-ray diffraction (XRD) pattern for Al-doped lithium iron phosphate (LFP) samples and standard LFP materials.

If not already mixed in with $Al(OH)_3$, the chemically delithiated LFP materials, with a chemical composition of $Li_{0.92}FePO_4$ and $Li_{0.83}FePO_4$, were thoroughly mixed with a stoichiometric amount of the synthesized $Al(OH)_3$ to form a mixture that matches with a final chemical composition of $Li_{0.92}Al_{0.027}FePO_4$ and $Li_{0.83}Al_{0.058}FePO_4$. A 10 wt % glucose solution was also thoroughly mixed with the delithiated LFP materials and $Al(OH)_3$ when the delithiated LFP was mixed with aluminum at the beginning of the process. Table 2 shows ICP-MS results of several doped samples. The doping was designed to dope Al on the Li sites and compensate the charge balance with lithium vacancy. The mixture was formed into a disk via hydraulic press, sintered at 300° C. for 4 h, and then at 650° C. for 10 h in an $N_2$ atmosphere. Aluminum was shown to be incorporated into the lattice of the LFP materials. The crystal structure of the two aluminum-doped LFP samples (2.7 mol % and 5.8 mol % respectively) was analyzed by X-ray diffraction (XRD) as shown in FIG. 2. The aluminum-doped LFP samples showed all characteristic peaks of standard LFP materials, and no impurity phases were detected by XRD.

TABLE 2

ICP-MS results of delithiated LFP materials and standard LFP materials.

| | Theoretical composition | Composition from ICP |
|---|---|---|
| 0% Al STD LFP | $LiFePO_4$ | $Li_{0.986}Fe_{0.901}PO_4$ |
| 2.67% Al-doped LFP | $Li_{0.92}Al_{0.027}FePO_4$ | $Li_{0.896}Al_{0.031}Fe_{0.909}PO_4$ |
| 5.83% Al-doped LFP | $Li_{0.83}Al_{0.058}FePO_4$ | $Li_{0.840}Al_{0.0630}Fe_{0.951}PO_4$ |

Figure 3:
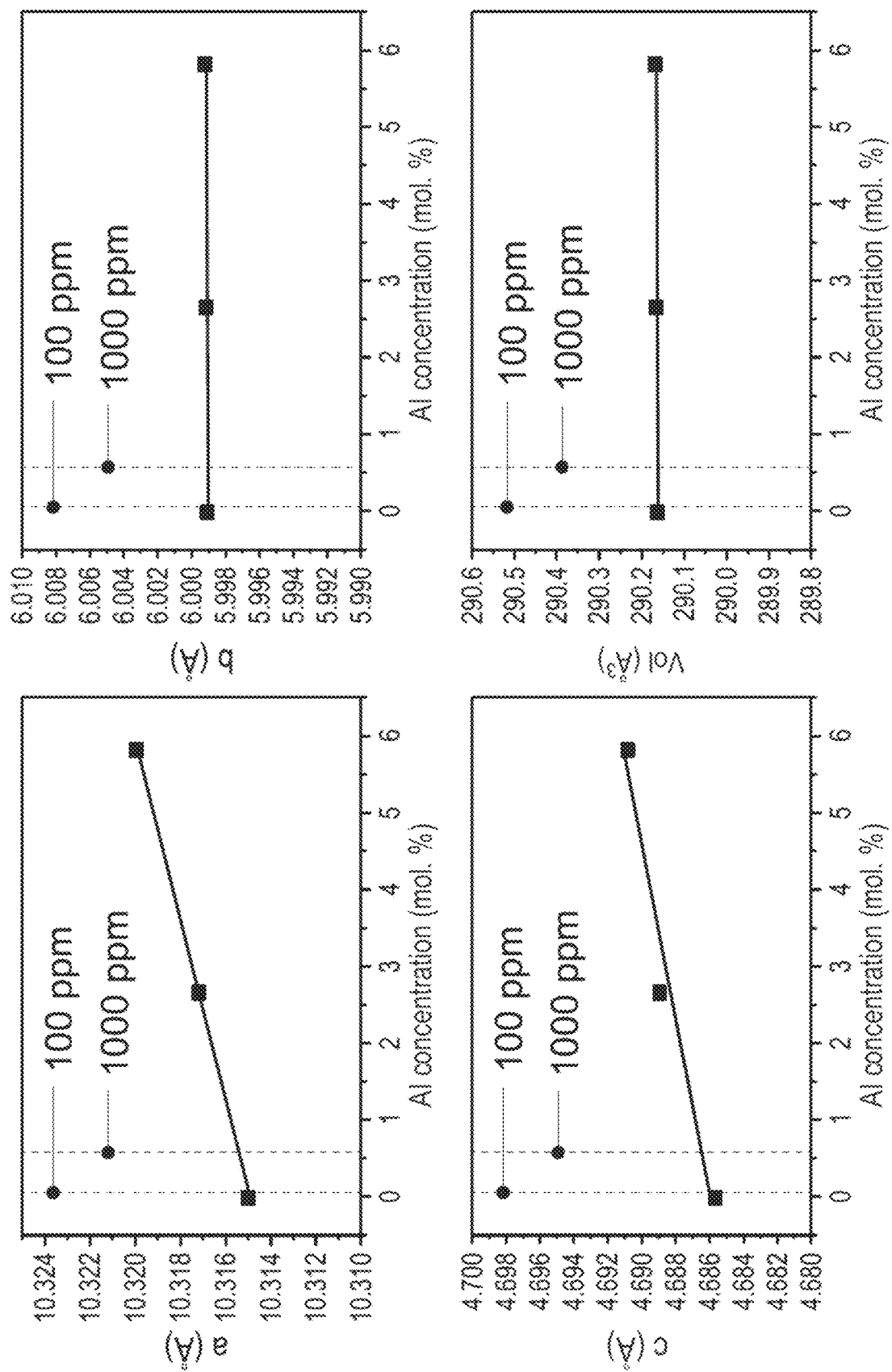
FIG. 3 shows the changes in lattice parameters for the Al-doped LFP samples compared with standard LFP materials.
Figure 4:
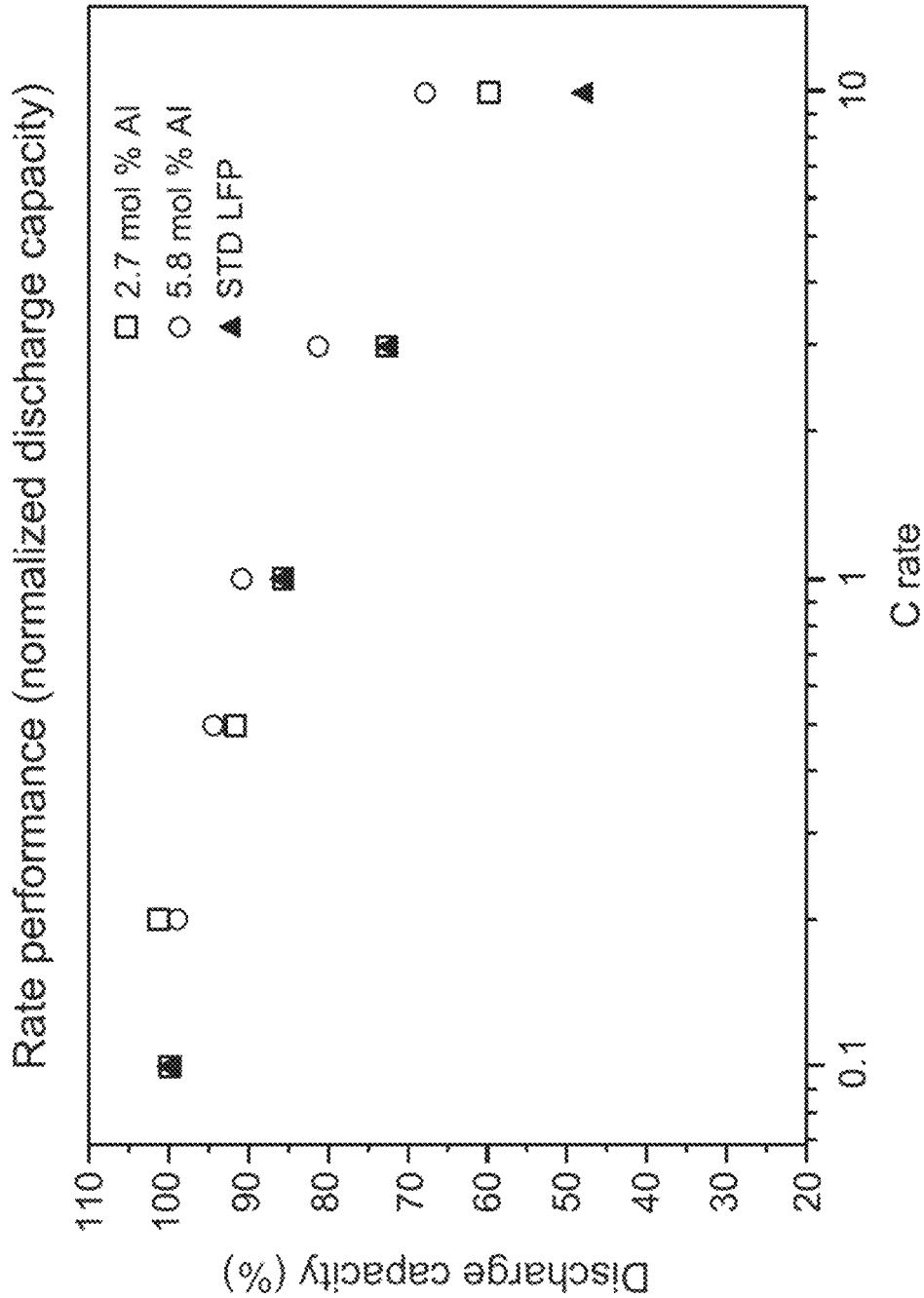
FIG. 4 shows the rate performance of the Al-doped LFP samples compared with standard LFP materials.

FIG. 3 shows the changes in lattice parameters for the Al-doped LFP samples compared with standard LFP materials. The unit cell parameters of the Al-doped samples, as well as the standard LFP materials, were calculated from the XRD patterns by Rietveld refinement using the GSAS-II package. Toby, Brian H. et al. "GSAS-II: the genesis of a modern open-source all purpose crystallography software package."*Journal of Applied Crystallography* 46.2 (2013): 544-549. The lattice parameters are shown in FIG. 4. An increase of lattice parameters a, c, and the cell volume were observed with the increase of Al doping concentration. This observation is consistent with the experimental results and simulation results from other published literature. (1) Meethong, Nonglak, et al. "Aliovalent substitutions in olivine lithium iron phosphate and impact on structure and properties."*Advanced Functional Materials* 19.7 (2009): 1060-1070. (2) Molenda, Janina, et al. "Structural, transport and electrochemical properties of LiFePO4 substituted in lithium andiron sublattices (Al, Zr, W, Mn, Co and Ni)." Materials 6.5 (2013): 1656-1687. (3) Chu-Ying, Ouyang, et al. "First principles study on NaxLi1-xFePO4 as cathode material for rechargeable lithium batteries." Chinese Physics Letters 23.1 (2006): 61. (4) Xu, Jing, and Gang Chen. "Effects of doping on the electronic properties of LiFePO4: A first-principles investigation." Physica B: Condensed Matter 405.3 (2010): 803-807. A linear change of lattice parameters was observed, consistent with Vegard's Law.

The electrochemical performance of the aluminum-doped LFP materials was measured in CR-2032 type coin cells composed of a lithium metal counter electrode, a polypropylene separator, and an electrolyte of 1 M $LiPF_6$ in EC/DME (3:7 by volume). The working electrodes were prepared by mixing 80 wt % LFP materials with 10 wt % PVDF and 10 wt % conductive carbon. The coin cells were charged at a C/10 rate and discharged at different C rates. The discharge capacity was normalized to the discharge capacity at the C/10 rate and the results are shown in FIG. 4. At a high discharge rate, the Al-doped LFP samples showed higher capacity retention compared to the discharge capacity at C/10. The increasing of Al concentration in LFP is shown to lead to a higher capacity retention.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of recycling battery waste, the battery waste including an electrode material and aluminum impurities, the method comprising:
    modifying the aluminum impurities to form a doping precursor such that the modifying includes converting the aluminum impurities into a metal layered double hydroxide compound as the doping precursor, the metal including at least one of lithium or aluminum; and
    incorporating the doping precursor into the electrode material.

2. The method of claim 1, further comprising:
    prior to modifying the aluminum impurities, preprocessing the battery waste to separate the electrode material and the aluminum impurities from other components included in the battery waste.

3. The method of claim 1, further comprising:
    prior to modifying the aluminum impurities, removing at least a portion of the aluminum impurities from the battery waste.

4. The method of claim 3, wherein the aluminum impurities are removed physically from the battery waste based on differences in physical properties of the aluminum impurities.

5. The method of claim 4, wherein the aluminum impurities are removed from the battery waste based on differences in density.

6. The method of claim 3, wherein the aluminum impurities are removed chemically from the battery waste.

7. The method of claim 6, wherein chemically removing the aluminum impurities includes:
    dissolving the aluminum impurities in a hydroxide solution; and
    separating the electrode material from the hydroxide solution.

8. The method of claim 7, wherein the hydroxide solution includes at least one of sodium hydroxide, potassium hydroxide, or lithium hydroxide.

9. The method of claim 6, wherein chemically removing the aluminum impurities includes:
    dissolving the aluminum impurities in an acid solution; and
    separating the electrode material from the acid solution.

10. The method of claim 1, wherein the electrode material prior to incorporating the precursor includes at least one of $LiCoO_2$, $LiMn_2O_4$, $LiFe_tM_{1-t}PO_4$, or $LiNi_aMn_bCo_cA_dO_2$, wherein:
    $a+b+c+d=1$,
    $0<t<1$,
    M includes a metal element; and
    A=Al, Zr, or Mg.

11. The method of claim 10, wherein:
    the doping precursor includes aluminum atoms;
    the electrode material includes at least one of lithium or iron; and incorporating the doping precursor includes inserting the aluminum atoms into the electrode material at the site of at least one of lithium atoms, or iron atoms.

12. The method of claim 11, wherein:
inserting the aluminum atoms into the electrode material causes the electrode material to have a composition of $Li_{1-3y}Al_yFePO_4$ or $LiFe_{1-1.5y}Al_yPO_4$.

13. The method of claim 1, further comprising:
adding an additional precursor material during modifying of the aluminum impurities.

14. The method of claim 13, wherein the additional precursor material includes at least one of $Li_2CO_3$, LiOH, $FePO_4$, or $(NH_4)_2HPO_4$.

15. The method of claim 1, wherein converting the aluminum impurities into the metal layered double hydroxide compound includes reacting the aluminum impurities with a lithium hydroxide aqueous solution.

16. The method of claim 1, wherein:
the doping precursor is a first doping precursor; and
modifying the aluminum impurities further includes converting aluminum impurities into aluminum hydroxide ($Al(OH)_3$) as a second doping precursor.

17. The method of claim 16, wherein converting the aluminum impurities into aluminum hydroxide includes:
reacting aluminum impurities with a hydroxide solution to form a mixture; and
adjusting a pH of the mixture to form the aluminum hydroxide.

18. The method of claim 17, wherein adjusting the pH of the mixture includes adding at least one acid to the mixture.

19. The method of claim 17, wherein adjusting the pH of the mixture includes pumping carbon dioxide gas into the mixture.

20. The method of claim 1, wherein:
the doping precursor is a first doping precursor; and
modifying the aluminum impurities further includes converting aluminum impurities into an aluminum alkoxide ($Al(RO)_3$) as a second doping precursor, where R is an alkyl group.

21. The method of claim 20, wherein converting the aluminum impurities into aluminum alkoxide includes:
reacting the aluminum impurities with an organic compound including at least one hydroxyl (—OH) functional group.

22. The method of claim 1, wherein incorporating the doping precursor into the electrode material includes subjecting the precursor and the electrode material to a heat treatment process.

23. The method of claim 22, wherein the heat treatment is performed in a controlled atmosphere, the controlled atmosphere including an inert, an oxidizing, or a reducing atmosphere.

24. A method of recycling battery waste, the battery waste including an electrode material including at least one of lithium or iron and aluminum impurities, the method comprising:

modifying the aluminum impurities to form a doping precursor, the doping precursor including aluminum atoms;
incorporating the precursor into the electrode material by inserting the aluminum atoms into the electrode material at the site of at least one of lithium atoms, or iron atoms,
wherein the electrode material includes at least one of $LiCoO_2$, $LiMn_2O_4$, $LiFe_tM_{1-t}PO_4$, or $LiNi_aMn_bCo_cA_dO_2$,
wherein:
a+b+c+d=1,
0<t<1,
M includes a metal element; and
A=Al, Zr, or Mg; and
wherein inserting the aluminum atoms into the electrode material causes the electrode material to have a composition of $Li_{1-3y}Al_yFePO_4$ or $LiFe_{1-1.5y}Al_yPO_4$.

25. The method of claim 24, further comprising:
prior to modifying the aluminum impurities, preprocessing the battery waste to separate the electrode material and the aluminum impurities from other components included in the battery waste.

26. The method of claim 24, further comprising:
prior to modifying the aluminum impurities, removing at least a portion of the aluminum impurities from the battery waste.

27. A method of recycling battery waste, the battery waste including an electrode material and aluminum impurities, the method comprising:
modifying the aluminum impurities to form a doping precursor, the modifying including converting the aluminum impurities into aluminum hydroxide ($Al(OH)_3$) as the doping precursor; and
incorporating the precursor into the electrode material,
wherein converting the aluminum impurities into aluminum hydroxide includes:
reacting aluminum impurities with a hydroxide solution to form a mixture; and
adjusting a pH of the mixture to form the aluminum hydroxide by adding at least one acid to the mixture.

28. A method of recycling battery waste, the battery waste including an electrode material and aluminum impurities, the method comprising:
modifying the aluminum impurities to form a doping precursor, the modifying including converting the aluminum impurities into aluminum hydroxide ($Al(OH)_3$) as the doping precursor; and
incorporating the precursor into the electrode material,
wherein converting the aluminum impurities into aluminum hydroxide includes:
reacting aluminum impurities with a hydroxide solution to form a mixture; and
adjusting a pH of the mixture to form the aluminum hydroxide by pumping carbon dioxide gas into the mixture.

* * * * *